(12) United States Patent
Choi et al.

(10) Patent No.: US 8,605,773 B2
(45) Date of Patent: Dec. 10, 2013

(54) APPARATUS AND METHOD FOR DATA COMMUNICATION USING RADIO FREQUENCY

(75) Inventors: Yu Tae Choi, Gyeonggi-do (KR); Young Seak Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 376 days.

(21) Appl. No.: 12/954,330

(22) Filed: Nov. 24, 2010

(65) Prior Publication Data

US 2012/0076240 A1 Mar. 29, 2012

(30) Foreign Application Priority Data

Sep. 27, 2010 (KR) .................... 10-2010-0093336

(51) Int. Cl.
*H04B 1/38* (2006.01)

(52) U.S. Cl.
USPC ........... 375/219; 375/303; 375/295; 375/302; 375/316

(58) Field of Classification Search
USPC .................... 375/303, 219, 295, 302, 316
See application file for complete search history.

(56) References Cited

U.S. PATENT DOCUMENTS

| | | | | |
|---|---|---|---|---|
| 5,497,372 A | * | 3/1996 | Nankoh et al. | 370/480 |
| 5,740,518 A | * | 4/1998 | Takashima et al. | 455/45 |
| 5,930,690 A | * | 7/1999 | Nakata | 455/186.1 |
| 6,307,890 B1 | * | 10/2001 | Dyson et al. | 375/265 |
| 7,949,320 B1 | * | 5/2011 | Lee | 455/205 |
| 2008/0139122 A1 | | 6/2008 | Hung et al. | |
| 2008/0146281 A1 | * | 6/2008 | Cohen et al. | 455/558 |

FOREIGN PATENT DOCUMENTS

| | | |
|---|---|---|
| JP | 08-008857 | 1/1996 |
| KR | 10-0325029 | 2/2002 |
| KR | 10-0376245 | 3/2003 |
| KR | 1020050005324 | 1/2005 |
| KR | 2007-0076693 A | 7/2007 |
| WO | 2006/003063 | 1/2006 |

OTHER PUBLICATIONS

Minimum shift keying: A spectrally efficient modulation, Date of Publication: Jul. 1979 Author(s): Pasupathy, S.*

* cited by examiner

*Primary Examiner* — Kenneth Lam
(74) *Attorney, Agent, or Firm* — Edwards Wildman Palmer LLP; Peter F. Corless

(57) ABSTRACT

A data communication apparatus using a radio frequency and a data processing method thereof are provided. A first communication apparatus frequency shift keying and phase shift keying modulates and transmits data from a service server to a radio frequency band. A second communication apparatus modulates, demodulates, and outputs the data. The data communication apparatus using a radio frequency, includes: a data modulation module frequency shift keying and phase shift keying modulates data to a radio frequency band to generate a modulated data signal; and a data transmission module transmitting the modulated data to another communication apparatus.

13 Claims, 7 Drawing Sheets

APPARATUS AND METHOD FOR DATA COMMUNICATION USING RADIO FREQUENCY

CROSS-REFERENCES TO RELATED APPLICATIONS

This application claims under 35 U.S.C. §119(a) the benefit of Korean Application No. 10-2010-0093336, filed on Sep. 27, 2010, which is incorporated by reference in its entirety.

BACKGROUND OF THE INVENTION

1. Field of the Invention

The present invention relates to an apparatus and a method for data communication using a radio frequency (RF), and a method thereof.

2. Description of the Related Art

Data Radio Channel (DARC) means a broadcasting service that adds a digital character signal such as news, stocks, and weather information to a residual frequency band (76 kHz band) of an FM wave band and transmits it. Here, the DARC uses a Level Controlled Minimum Shift Keying (LMSK) modulation scheme to transmit a digital character signal to an FM wave band. However, the LMSK transmission scheme has transmission speed of 16000 bps on a specification and is susceptible to noise and error.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in view of the above problems, and provides a data communication method using RF capable of improving transmission speed and being robust to error and noise, and a method thereof.

In accordance with an aspect of the present invention, a data communication apparatus using a radio frequency includes: a data modulation module frequency shift keying and phase shift keying modulates a data to a radio frequency band to generate a modulated data signal; and a data transmission module transmitting the modulated data to another communication apparatus.

The data modulation module allots bits of the data by frequencies and phases in a set frequency band, respectively, to generate the modulated data signal.

In accordance with an aspect of the present invention, a data communication apparatus using a radio frequency further includes: a receiving module receiving the data from a service serve or an input module; a channel coding module performing channel coding for error detection and correction of the received data; and a synchronizing module adding a preamble and a postamble to the data to synchronize the channel coded data.

In accordance with an aspect of the present invention, a data communication apparatus using a radio frequency further includes: a frequency modulation (FM) module frequency modulating and outputting a voice signal from a service server or a separate input module; a voice transmission module transmitting the modulated voice signal together with a general radio broadcasting signal; and a mode control module receiving a data transmission initiation signal or a voice transmission initiation signal from the service server to switch between a data transmission mode and a voice transmission mode, wherein the mode control module operates the data modulation module in the data transmission mode, and operates the FM module in the voice transmission mode. The radio frequency band ranges from 53 kHz to 100 kHz, and an interval between frequencies is 150 Hz.

In accordance with an aspect of the present invention, a data communication apparatus using a radio frequency further includes: a communication module receiving the modulated data signal together with a general radio broadcasting signal; a separation module separating and extracting the modulated data signal from the modulated data signal and the general radio broadcasting signal based on a frequency band; a data demodulation module demodulating the extracted and demodulated data signal to digital data; and a service module outputting the demodulated digital data.

The data demodulation module includes: a match filter minimizing Inter-symbol Interference (ISI) of the separated and modulated data signal to maximize a signal-to-noise ratio; a data demodulation module demodulating modulated data having a maximized signal-to-noise ratio to extract digital data by frequencies; a synchronizing module synchronizing the digital data using a preamble and a postamble of the extracted and modulated data signal; and a reverse channel coding module performing reverse channel coding of the synchronized and modulated data signal.

In accordance with an aspect of the present invention, a data communication apparatus using a radio frequency further includes: a voice demodulation module demodulating a voice signal received from the another communication apparatus.

In accordance with another aspect of the present invention, a data communication method using a radio frequency includes: (a) frequency shift keying and phase shift keying modulating data to a radio frequency band to generate a modulated data signal; and (b) transmitting the modulated data signal to another communication apparatus.

The step (a) includes allotting bits of the data by frequencies and phases in a set frequency band, respectively.

In accordance with another aspect of the present invention, before step (a), a data communication method using a radio frequency further includes: (a-1) receiving the data from a service serve or an input module; (a-2) performing channel coding for error detection and correction of the received data; and (a-3) adding a preamble and a postamble to the data to synchronize the channel coded data.

In accordance with another aspect of the present invention, a data communication method using a radio frequency further includes: (c) frequency modulating and outputting a voice signal from a service server or a separate input module; (d) transmitting the modulated voice signal together with a general radio broadcasting signal; (e) receiving a data transmission initiation signal or a voice transmission initiation signal from the service server to switch between a data transmission mode and a voice transmission mode; and (f) operating the data modulation module in the data transmission mode, and operating the FM module in the voice transmission mode by the mode control module.

In accordance with another aspect of the present invention, a data communication method using a radio frequency further includes: (g) receiving the modulated data signal together with a general radio broadcasting signal; (h) separating and extracting the modulated data signal from the modulated data signal and the general radio broadcasting signal based on a frequency band; (i) demodulating the extracted and demodulated data signal to digital data; and (j) outputting the demodulated digital data.

The step (i) includes: (i-1) minimizing Inter-symbol Interference (ISI) of the separated and modulated data signal to maximize a signal-to-noise ratio; (i-2) demodulating modulated data having a maximized signal-to-noise ratio to extract digital data by frequencies; (i-3) synchronizing the digital data using a preamble and a postamble of the extracted and modulated data signal; and (i-4) performing reverse channel coding of the synchronized and modulated data signal.

In accordance with another aspect of the present invention, a data communication method using a radio frequency further includes: demodulating a voice signal received from the another communication apparatus.

A data communication apparatus FSK and PSK modulates data to an RF band, and transmits the modulated data to a communication apparatus through a broadcasting network. Accordingly, the present invention can generate 312 frequencies (channels) in a band ranging from 53 kHz to 100 kHz being a residual frequency band except for a frequency band used in a radio broadcast. Accordingly, because data of 3 bits can be transmitted every 6 ms by frequencies (channels), transmission speed is 156000 bps. Transmission speed of a data signal of the present invention is increased ten times in comparison with transmission speed of a data signal of a conventional DARC being 16000 bps on a specification.

Furthermore, because the present invention modulates data using FSK and PSK modulation schemes, it provides an effect capable of implementing a reliable communication system robust to error and noise, which are characteristics of the FSK and PSK modulation schemes.

Moreover, in the data communication apparatus using an RF of the present invention, a mode control module receives a data transmission initiation signal or a voice transmission initiation signal to switch between a data transmission mode and a voice transmission mode. Accordingly, the present invention provides an effect capable of selectively communication data or a voice signal in a residual frequency band except for frequencies used in a radio broadcast.

In addition, the data communication apparatus using an RF of the present invention provides an effect capable of performing two-way communication for data or voices between communication apparatuses through a radio broadcasting network.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
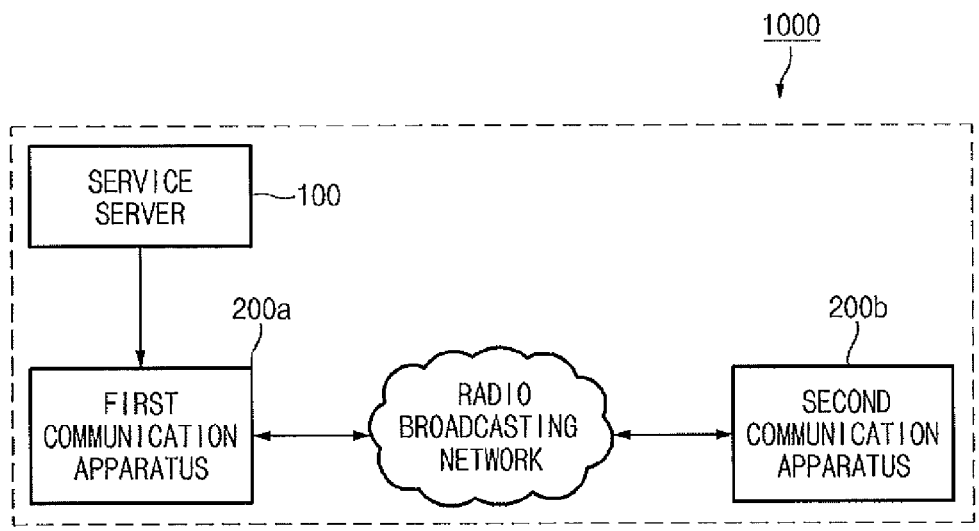
FIG. 1 is a block diagram illustrating the configuration of a data communication network using a radio frequency according to an embodiment of the present invention.

FIG. 1 is a block diagram illustrating an example of the configuration of a data communication network 1000 using a radio frequency according to an embodiment of the present invention.

The data communication network 1000 using a radio frequency according to an embodiment of the present invention includes a service server 100, a first communication apparatus 200a, and a second communication apparatus 200b.

The service server 100 generates transmission target data that the first communication apparatus 200a will transmit to the second communication apparatus 200b.

The first communication apparatus 200a receives the data from the service server 100 and frequency shift keying (FSK) and phase shift keying (PSK) modulates the received data to an RF band to generate a modulated data signal. Further, the first communication apparatus 200a transmits the modulated data signal together with an RF signal, namely, a general radio broadcasting signal through an RF broadcasting network.

The second communication apparatus 200b receives the modulated data signal through the radio broadcasting network, and demodulates and outputs the modulated data signal to digital data.

Hereinafter, a data communication system using a radio frequency according to an embodiment of the present invention will be described by structural elements in detail.

Service Server 100

Figure 2:
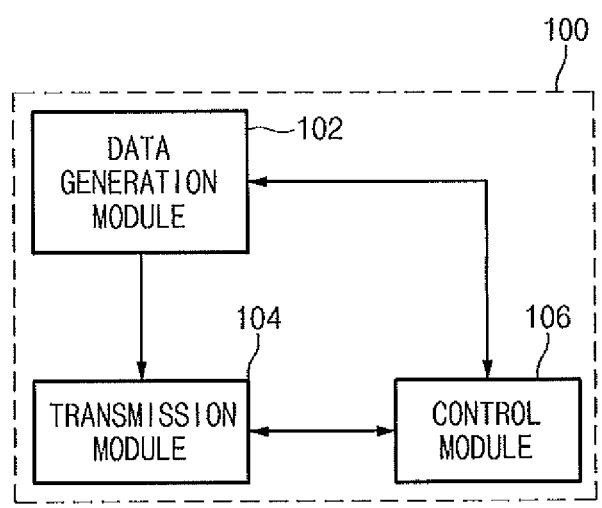
FIG. 2 is a block diagram illustrating the configuration of a service server of a data communication network using a radio frequency according to an embodiment of the present invention.

FIG. 2 is a block diagram illustrating an example of the configuration of the service server 100 of a data communication network 1000 using an RF according to an embodiment of the present invention.

The service server 100 includes a data generation module 102, a transmission module 104, and a control module 106.

The service server 100 is preferably provided with a service provider server generating a voice (audio) signal or data such as traffic information, road guide information, and stock information. Here, the service server 100 can receive data provided from an external data generation system.

The transmission module 104 transmits the voice signal or data to the first communication apparatus 200a.

The control module 106 checks whether information to be transmitted from the service server 100 is a voice signal or data. When the information to be transmitted from the service server 100 is a voice signal, the control module 106 transmits a voice transmission initiation signal to a communication apparatus, as explained below. Meanwhile, when the information to be transmitted from the service server 100 is a data, the control module 106 transmits a data transmission initiation signal to a communication apparatus, as explained below. Accordingly, when the first communication apparatus 200a receives the data transmission initiation signal from the service server 100, it can operate a device, namely, a data modulation module 208 modulating the data in the first communication apparatus 200a. Furthermore, when the first communication apparatus 200a receives the voice transmission initiation signal from the service server 100, it can operate a device, namely, an FM modulation module 212 modulating the voice signal.

Hereinafter, the first communication apparatus 200a and the second communication apparatus 200b have the same structural elements. However, for clarity of explanation of the present invention, a communication device performing transmission is referred to as 'a first communication apparatus 200a', and a communication device performing reception is referred to as 'a second communication apparatus 200b.'

First Communication Apparatus 200a

Figure 3:
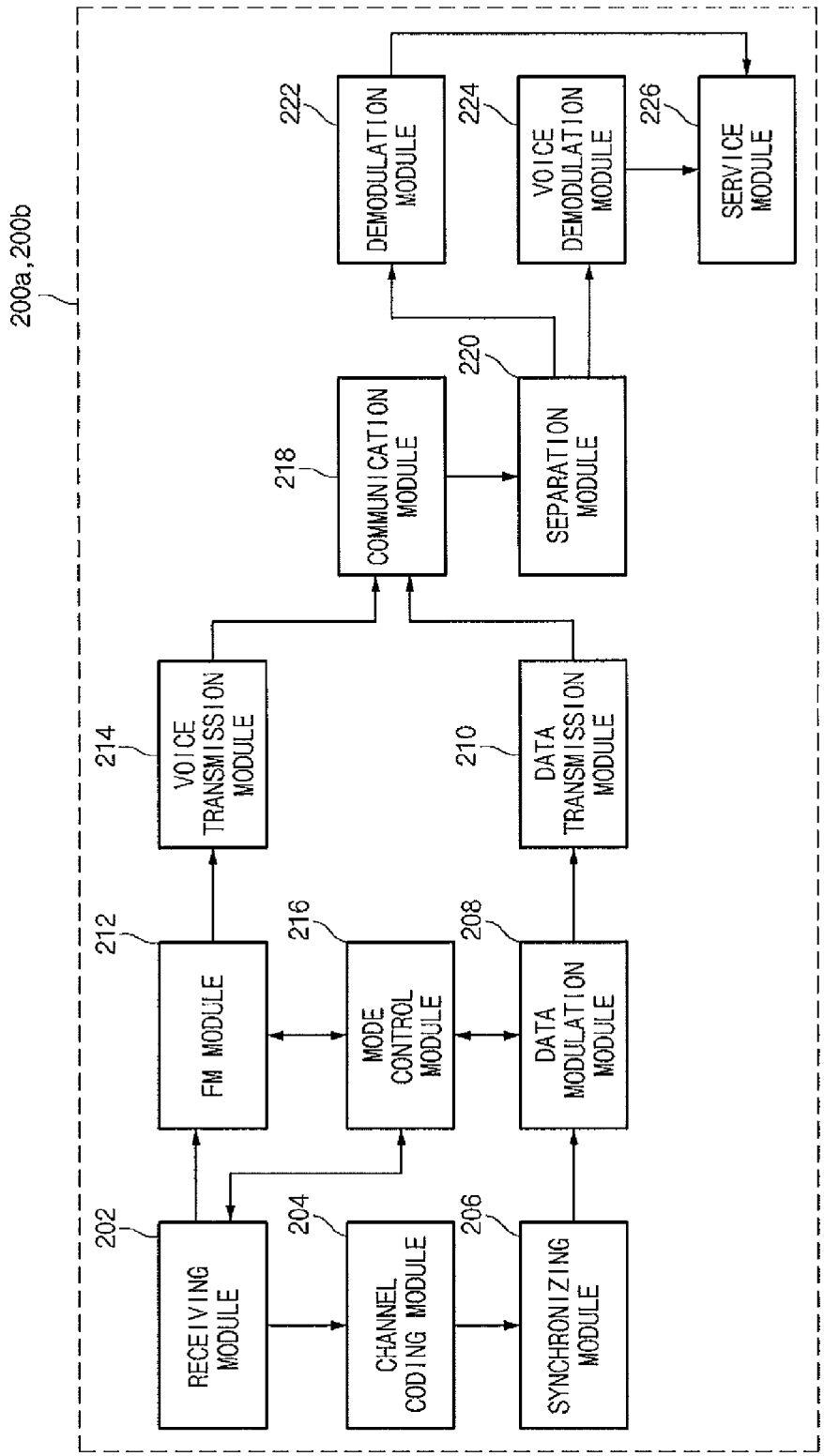
FIG. 3 is a block diagram illustrating the configuration of a communication apparatus of a data communication network using a radio frequency according to an embodiment of the present invention.

FIG. 3 is a block diagram illustrating an example of the configuration of the first communication apparatus 200a or the second communication apparatus 200b of the data communication network 1000 using an RF according to an embodiment of the present invention.

The first communication apparatus 200a includes a receiving module 202, a channel coding module 204, a synchronizing module 206, a data modulation module 208, a data transmission module 210, an FM modulation module 212, a voice transmission module 214, and a mode control module 216.

The receiving module 202 receives a data or a voice signal provided from the service server 100.

The channel coding module 204 performs error detection and correction of the data received from the service server 100, namely, performs channel coding using a known convolution coding or turbo coding for Forward Error Correction (FEC). In this case, the channel coding module 204 may further use a known interleaver method distributing an error to further reduce a burst error focused in a specific part in a demodulation procedure for the data in the second communication apparatus 200b.

The synchronizing module 206 adds a preamble and a postamble to the data to synchronize a channel coded data with the second communication apparatus 200b.

Figure 4:
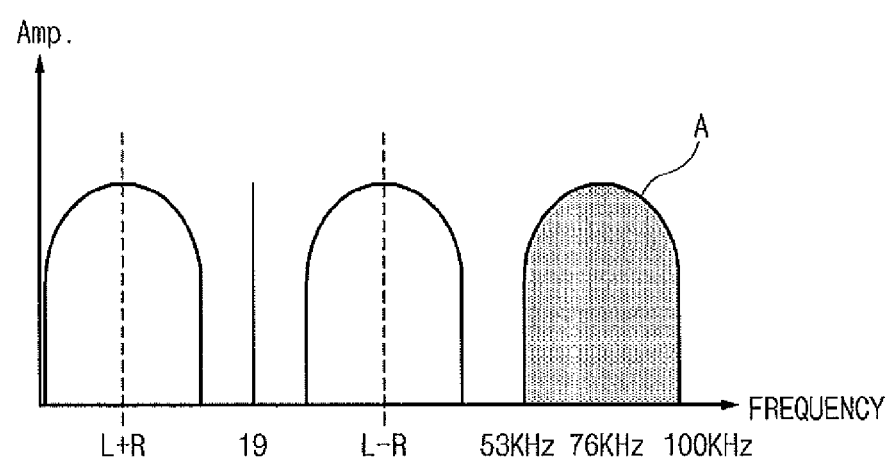
FIG. 4 is a graph illustrating usable frequency bands of a data communication network using a radio frequency according to an embodiment of the present invention.
Figure 5:
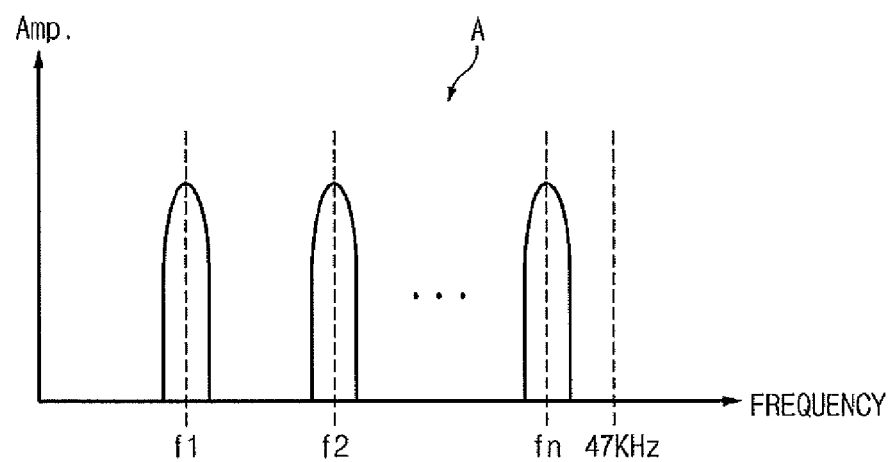
FIG. 5 is a graph illustrating a procedure of generating a plurality of frequencies in usable frequency bands of a data communication network using a radio frequency according to an embodiment of the present invention.
Figure 6:
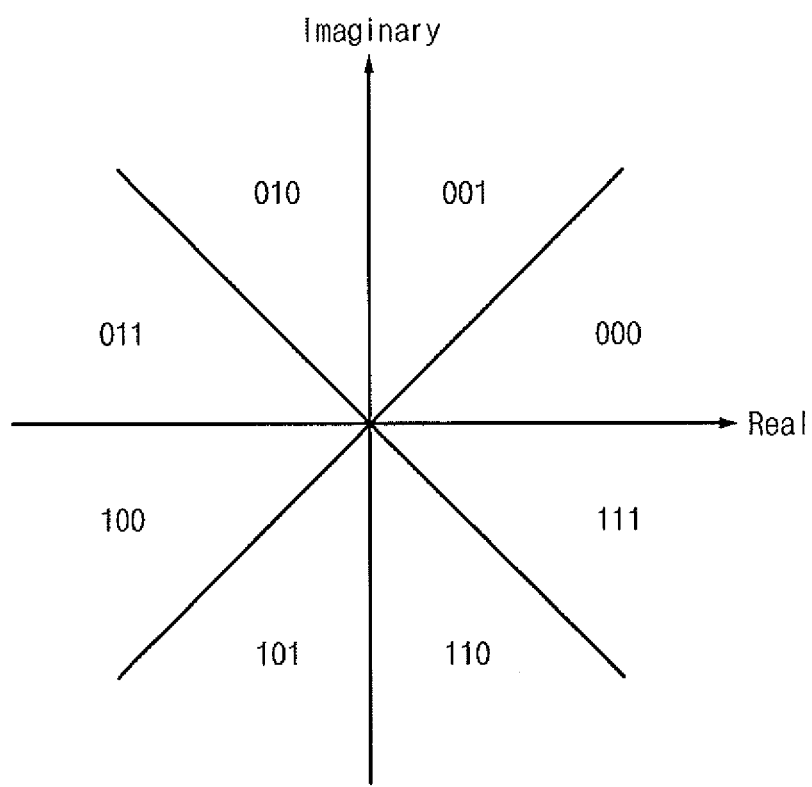
FIG. 6 is a graph illustrating allotted patterns of a data bit by phases in a phase shift keying modulation scheme.

FIG. 4 is a graph illustrating an example of a usable frequency band of the data communication network 1000 using an RF according to an embodiment of the present invention. FIG. 5 is a graph illustrating an example of a procedure of generating a plurality of frequencies in usable frequency bands of the data communication network 1000 using a radio frequency according to an embodiment of the present invention. FIG. 6 is a graph illustrating an example of allotted patterns of a data bit by phases in a phase shift keying modulation scheme.

The data modulation module 208 FSK or PSK modulates the data to the RF band, namely, to a set RF band. The FSK modulation is a modulation scheme that changes a frequency of a carrier wave while maintaining amplitude thereof according to magnitude of a signal wave. Meanwhile, the PSK modulation is a modulation scheme that equally divides (phase difference of 45°) a phase of a carrier wave into eight to modulate it according to magnitude of a signal. When the FSK scheme and the PSK scheme are used, data of 3 bits can be transmitted through variation of 8 equal division phase difference. Here, the set RF band uses a residual frequency (part A) except for frequencies L+R, 19, and L-R bands used in a general radio broadcast. The residual frequency uses a bandwidth of 47 kHz from 53 kHz to 100 kHz. When a plurality of frequencies (channels) is generated with an interval between frequencies (channels) of 150 Hz in the bandwidth of 47 kHz, about 313 frequencies (channels) can be used (generated). Here, when an interval between frequencies (channels) is too narrow, interference can occur between the frequencies. When the interval between the frequencies is too wide, a use efficiency of the frequencies is deteriorated. Accordingly, the 150 Hz becomes an interval maximizing the interference and use efficiency.

Accordingly, because data of 3 bits in 313 frequencies (channels) can be transmitted every 6 ms by frequencies (channels), transmission speed=313 frequencies×3 bits×1000/6 (the number of bits to be sent for 1000 ms because it takes 6 ms in one transmission)=156000 bps. Transmission speed of a data signal of the present invention is increased ten times in comparison with transmission speed of a data signal of a conventional DARC being 16000 bps on a specification.

The data transmission module 210 transmits the FSK and PSK modulated data signals together with a general radio broadcasting signal through a radio broadcasting network. Because a bandwidth of the data signal differs from that of the general radio broadcasting signal, although the data signal is transmitted together with the general radio broadcasting signal, they do not interfere with each other.

The FM module 212 frequency modulates and outputs a voice signal from the service server 100. Here, the FM modulation of the voice signal is the same as a modulation scheme of a general FM radio broadcast.

The voice transmission module 214 transmits the voice signal modulated in the FM module 212 together with a general radio broadcasting signal through a radio broadcast network.

The mode control module 216 receives a data transmission initiation signal or a voice transmission initiation signal to switch between a data transmission mode and a voice transmission mode. Namely, the mode control module 216 operates the data modulation module 208 in the data transmission mode, and operates the FM module 212 in the voice transmission mode.

Second Communication Apparatus 200b

The second communication apparatus 200b includes a communication module 218, a separation module 220, a data demodulation module 222, a voice demodulation module 224, and a service module 226.

The communication module 218 receives a modulated data signal and a general radio broadcast signal, or a modulated voice signal and the general broadcasting signal from the first communication apparatus 200a through a radio broadcasting network. Here, the second communication apparatus 200b may further include a separate data checking means (not shown) checking whether a signal received from the first communication apparatus 200a through the radio broadcasting network is a data signal and a general radio broadcasting signal, or a voice signal and the general radio broadcasting signal.

The separation module 220 extracts the modulated data signal from the modulated data signal and the general radio broadcasting signal based on a frequency band (because the data signal is included in a frequency band from 53 kHz to 100 kHz being a residual frequency band except for frequencies used in a general radio broadcast). The separation module 220 extracts the modulated voice signal from the modulated voice signal and the general radio broadcasting signal based on a frequency band (because the voice signal is included in a frequency band from 53 kHz to 100 kHz being a residual frequency band except for frequencies used in a general radio broadcast).

The data demodulation module 222 demodulates a modulated data signal, and includes a match filter (not shown), a data demodulation module 222, a synchronizing module 206, and a reverse channel coding module 204.

The match filter minimizes Inter-symbol Interference (ISI) of a separated and modulated data signal to maximize a signal-to-noise ratio.

The data demodulation module 222 demodulates a modulated data signal with a maximized signal-to-noise ratio to extract digital data by frequencies.

The synchronizing module 206 synchronizes the digital data using a preamble and a postamble of the extracted and modulated data signal, and removes the preamble and the postamble.

The reverse channel coding module 204 performs reverse channel coding for the synchronized and modulated data signal and deinterleaver.

The voice demodulation module 224 demodulates a voice signal from the first communication apparatus 200a in a typical FM demodulation method.

The service module 226 outputs the demodulated digital data or voice signal to a user.

As illustrated earlier, in the present invention, the first communication apparatus 200a and the second communication apparatus 200b are configured by the same construction. Accordingly, the second communication apparatus 200b may transfer data/voices input by a user to the first communication apparatus 200a through a separate data/voice generator (having the same construction as that of the service server 100) or a data/voice input module (not shown). Accordingly, the data communicating apparatuses according to the present invention can perform two-way communication between the first communication apparatus 200a and the second communication apparatus 200b using a radio broadcasting network.

Figure 7:
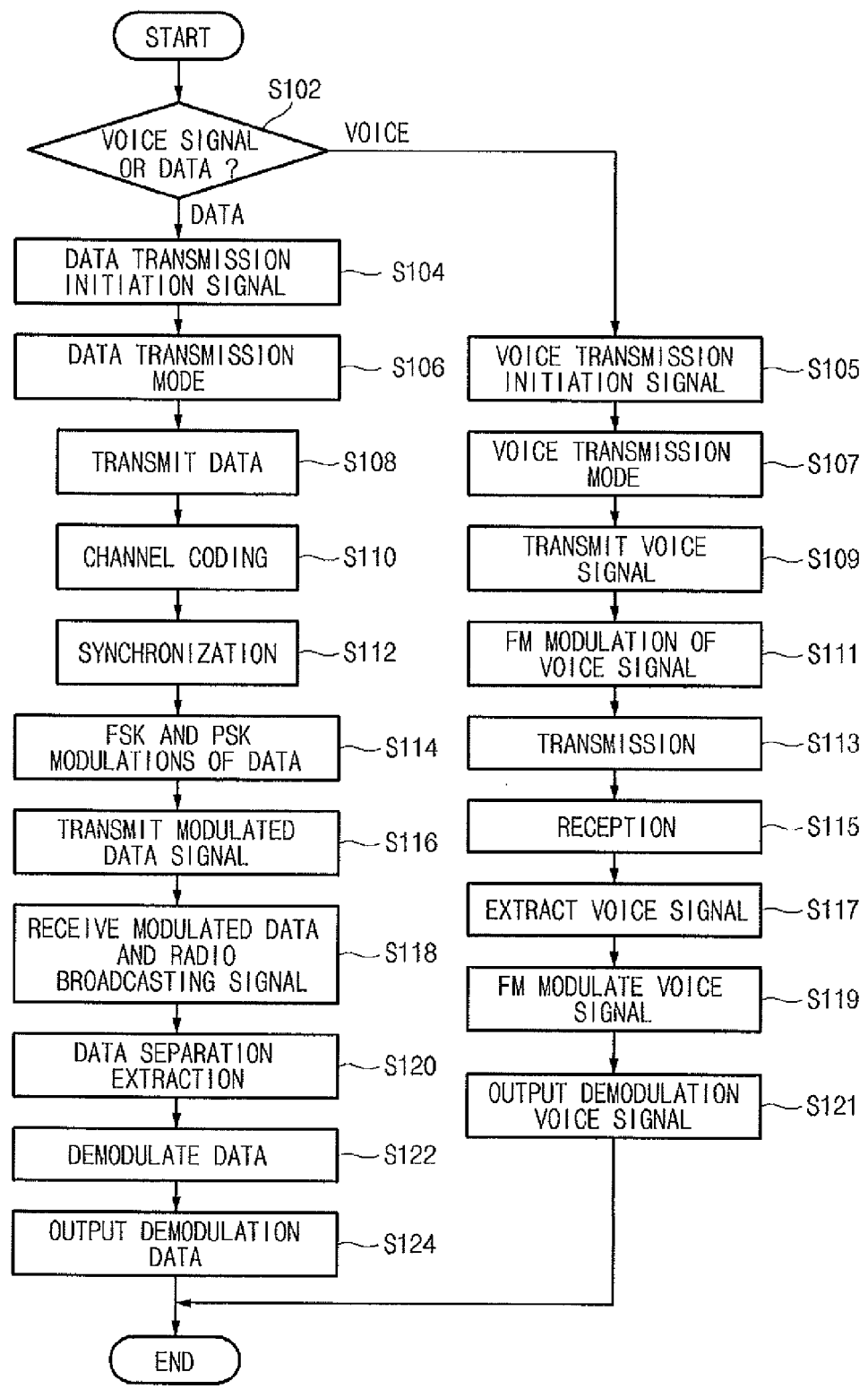
FIG. 7 is a flowchart illustrating a data communication method using a radio frequency according to an embodiment of the present invention.

Hereinafter, a data communication method using the data communication network 1000 according to an embodiment of the present invention will be described with reference to FIG. 7.

First, the control module 106 of the service server 100 checks whether information to be transmitted (generated) from the service server 100 is a voice signal or data (S102).

When the information to be transmitted from the service server 100 is the data, the control module 106 of the service server 100 transmits a data transmission initiation signal to the first communication apparatus 200a to be explained below Next, the mode control module 216 of the first communication apparatus 200a receives a data transmission initiation signal from the service server 100 to switch the first communication apparatus 200a to a data transmission mode (S106).

Subsequently, the transmission module 104 of the service server 100 generates and transmits data to the first communication apparatus 200a (S108).

Next, the channel coding module 204 of the first communication apparatus 200a performs channel coding for error detection and correction of data provided from the service server 100 (S110).

The synchronizing module 206 of the first communication apparatus 200a adds a preamble and a postamble to channel coded data to synchronize the data (S112).

The data modulation module 208 of the first communication apparatus 200a generates a data signal modulated through FSK modulation and PSK modulation allotting bits of the data by frequencies and phases in a set frequency band (S114).

The data transmission module 210 of the first communication apparatus 200a transmits the modulated data signal together with a general radio broadcasting signal through a radio broadcasting network (S116).

The receiving module 202 of the second communication apparatus 200b receives the modulated data signal and the general radio broadcasting signal (S118).

The separation module 220 of the second communication apparatus 200b separates and extracts the modulated data signal form the modulated data signal and the general radio broadcasting signal based on a frequency band (S120).

Next, the data demodulation module 22 of the second communication apparatus 200b demodulates the extracted and modulated data signal to a digital data (S122).

Subsequently, the service module 226 of the second communication apparatus 200b outputs the demodulated digital data (S124).

Conversely, when the information to be transmitted from the service server 100 is a voice signal in step 102, the control module 106 of the service server 100 transfers a voice transmission initiation signal to the first communication apparatus 200a to be explained below (S105).

Next, the mode control module 216 of the first communication apparatus 200a receives a voice transmission initiation signal from the service server 100 to switch the first communication apparatus 200a to a voice transmission mode (S107).

Next, the transmission module 104 of the service server 100 generates and transfers a voice signal to the first communication apparatus 200a (S109).

Next, the FM module 212 of the first communication apparatus 200a FM modulates and outputs the voice signal provided from the service server 100 (S111).

Then, the voice transmission module 214 of the first communication apparatus 200a transmits the modulated voice signal together with a general radio broadcasting signal (S113).

Next, the receiving module 202 of the second communication apparatus 200b receives the modulated voice signal and a general radio broadcasting signal (S115).

The separation module 220 of the second communication apparatus 200b extracts the modulated voice signal from the modulated voice signal and the general radio broadcasting signal based on a frequency band (S117). Subsequently, the voice demodulation module 224 of the second communication apparatus 200b demodulates the extracted voice signal in an FM scheme (S119). Next, the service module 226 of the second communication apparatus 200b outputs the demodulated voice signal (S121).

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A data communication apparatus comprising:
 a data modulation module couple to a data transmission module operable to: frequency shift keying and frequency shift keying and phase shift keying modulates data to a radio frequency band to generate a modulated data signal;
 the data transmission module operable to: transmit the modulated data to another communication apparatus;
 a frequency modulation (FM) module coupled to the data transmission module operable to: frequency modulate and output a voice signal from a service server or a separate input module;

a voice transmission module coupled to the frequency modulation (FM) module operable to: transmit the modulated voice signal together with a general radio broadcasting signal; and a mode control module coupled to the voice transmission module operable to: receive a data transmission initiation signal or a voice transmission initiation signal from the service server to switch between a data transmission mode and a voice transmission mode, wherein the mode control module operates the data modulation module in the data transmission mode, and operates the FM module in the voice transmission mode.

2. The data communication apparatus of claim 1, wherein the data modulation module allots bits of the data by frequencies and phases in a set frequency band, respectively, to generate the modulated data signal.

3. The data communication apparatus of claim 1, further comprising:
 a receiving module coupled to the FM module operable to: receive the data from a service serve of an input module;
 a channel coding module coupled to the receiving module operable to: perform channel coding for error detection and correction of the received data; and
 a synchronizing module coupled to the channel coding module operable to: add a preamble and a postamble to the data to synchronize the channel coded data.

4. The data communication apparatus of claim 1, wherein the radio frequency band ranges from 53 kHz to 100 kHz, and an interval between frequencies is 150 Hz.

5. The data communication apparatus of claim 1, further comprising:
 a communication module coupled to the data transmission module operable to: receive the modulated data signal together with a general radio broadcasting signal;
 a separation module coupled to the communication module operable to: separate and extract the modulated data signal from the modulated data signal and the general radio broadcasting signal based on a frequency band;
 a data demodulation module coupled to the separation module operable to: demodulate the extracted and demodulated data signal to a digital data; and
 a service module coupled to the data demodulation module operable to: output the demodulated digital data.

6. The data communication apparatus of claim 5, wherein the data demodulation module comprises:
 a match filter operable to: minimize Inter-symbol Interference (ISI) of the separated and modulated data signal to maximize a signal-to-noise ratio; a data demodulation module coupled to the match filter operable to: demodulate modulated data having a maximized signal-to-noise ratio to extract a digital data by frequencies;
 a synchronizing module coupled to the data demodulation module operable to: synchronize the digital data using a preamble and a postamble of the extracted and modulated data signal; and
 a reverse channel coding module coupled to the synchronizing module operable to: perform reverse channel coding of the synchronized and modulated data signal.

7. The data communication apparatus of claim 1, further comprising:
 a voice demodulation module coupled to the voice transmission module operable to: demodulate a voice signal received from the another communication apparatus.

8. A data communication method using a radio frequency, comprising:
 (a) frequency shift keying and phase shift keying modulating a data to a radio frequency band to generate a modulated data signal; and
 (b) transmitting the modulated data signal to another communication apparatus
 (c) frequency modulating and outputting a voice signal from a service server or a separate input;
 (d) transmitting the modulated voice signal together with a general radio broadcasting signal; and
 (e) receiving a data transmission initiation signal or a voice transmission initiation signal from the service server to switch between a data transmission mode and a voice transmission mode.

9. The method of claim 8, wherein step (a) comprises allotting bits of the data by frequencies and phases in a set frequency band, respectively.

10. The method of claim 8, before step (a), further comprising:
 (a-1) receiving the data from a service serve or an input module;
 (a-2) performing channel coding for error detection and correction of the received data; and
 (a-3) adding a preamble and a postamble to the data to synchronize the channel coded data.

11. The method of claim 8, further comprising:
 (f) receiving the modulated data signal together with a general radio broadcasting signal;
 (g) separating and extracting the modulated data signal from the modulated data signal and the general radio broadcasting signal based on a frequency band;
 (h) demodulating the extracted and demodulated data signal to a digital data; and
 (i) outputting the demodulated digital data.

12. The method of claim 11, wherein step (h) comprises:
 (h-1) minimizing Inter-symbol Interference (ISI) of the separated and modulated data signal to maximize a signal-to-noise ratio;
 (h-2) demodulating modulated data having a maximized signal-to-noise ratio to extract digital data by frequencies;
 (h-3) synchronizing the digital data using a preamble and a postamble of the extracted and modulated data signal; and
 (h-4) performing reverse channel coding of the synchronized and modulated data signal.

13. The method of claim 8, further comprising (j) demodulating a voice signal received from the another communication apparatus.

* * * * *